Feb. 28, 1928.
C. E. JOHNSON ET AL
1,661,074
SILENT CHAIN
Filed Nov. 9, 1925
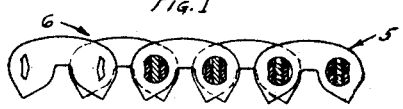
Fig. 1
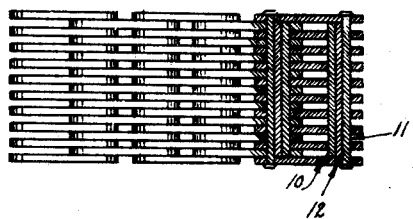
Fig. 2
    
Fig. 3   Fig. 4   Fig. 5
    
Fig. 6   Fig. 7   Fig. 8
INVENTORS
Carl E. Johnson
John Francis McLean Patented Feb. 28, 1928.

1,661,074

UNITED STATES PATENT OFFICE.

CARL E. JOHNSON AND JOHN FRANCIS McCANN, OF SPRINGFIELD, MASSACHUSETTS, ASSIGNORS TO DUCKWORTH CHAIN AND MANUFACTURING COMPANY, OF SPRINGFIELD, MASSACHUSETTS, A CORPORATION OF MASSACHUSETTS.

SILENT CHAIN.

Application filed November 9, 1925. Serial No. 67,927.

This invention relates to power transmission chain referred to as silent chain, and has special reference to the joint construction used between chain links that are to be hinged together by means of two hardened steel angular bushings and one hardened steel flat pin that mutually cooperate, allowing the links to turn freely thereon.

One object of the invention is the reduction to a minimum of the friction in a chain joint, and consequently the production of a chain in which the lengthening or stretching due to wear in the joints shall be negligible. The only means by which silent chain driving can be made practicable lies in the construction of a chain whose pitch shall not change perceptibly by long use, since in chains where stretch is not eliminated the pitch between the chain and sprocket wheels soon varies to such a degree as to destroy both the sprocket wheels and the chain. Stretching is eliminated in the present construction due to the co-action of the hardened steel angular bushings and the hardened flat steel pin, which mutually co-operate allowing the chain links to articulate with a minimum of friction.

Another object of the invention is to allow the chain to articulate with the two angular bushings as rockers and still keep the centers of the alternating links in their relative position with each other. This is done by means of the center pin which is substantially flat in form excepting its edges which are rounded off on the same radius as the hole in the links.

A further object of the invention is to allow the chain links to turn with the angular bushings and flat pin, minimizing the backlash ordinarily associated with a "rocker type" chain as one point of each rocker rides below the center of the corresponding rocker when the chain is wrapped around the drive sprockets revolving at terrific speed velocity.

The construction of the chain will be better understood by reference to the following specification and accompanying drawing in which:—

Fig. 1 is an elevation, partly in section, showing a chain conforming to the invention.

Fig. 2 is a plan view thereof, partly in section.

Fig. 3 is an elevation of one of the links.

Fig. 4 is an elevation of one of the center guide links.

Fig. 5 is an elevation of one of the extreme outside links.

Fig. 6 is a detail in section, showing one link with angular bushings and flat pin therein.

Fig. 7 is a view in perspective showing the angular bushing.

Fig. 8 is a view in perspective showing the flat center pin.

In devising a link for the silent chain the general shape and outline shall be the same as commonly used, which is shaped to conform with standard sprocket teeth. The joint hole being circular, excepting one side which is convex to accommodate the angular bushings, must have sufficient clearance to allow the chain to articulate. In other words, the circular hole being larger than the angular bushings, an undesirable amount of clearance is manifested which would introduce a great amount of wear.

In order that there may be a minimum of wear and clearance and "play" in the chain the flat center pin is introduced between the two angular bushings. This pin is substantially flat in form, excepting its edges which are made the same radius as the holes in the links. The round edges bearing upon the inside of the links allow the flat pin to turn slightly when the angular bushings articulate with the links. At the same time it prevents the individual links from losing their respective positions relative to the center line of the chain. Thus we are enabled to produce an extremely efficient anti-friction chain that has a true rocking action, and yet is free of the excessive clearance ordinarily associated with the rocker type of chain, as one rocker rides below the center of the other when the chain wraps around a sprocket.

With this general statement of the chief purpose and objects of the invention, the following more detailed description will be understood:—

Referring to the drawing "5" indicates a link of the chain "6" which, as indicated in Fig. 3, has the accepted external outline, and is provided with two circular holes "7" which have a convex surface at "8". The links are preferably assembled singly, with the convex surface of the holes opposite each other in each alternating link.

The angular bushings "10" and "11" are then inserted with the flat pin "12" betwen them. The angular bushings have in addition to their angular face a convex surface that rests against the cooperating surface of each alternative link. The angular face of the bushings "10" and "11" give a true rolling contact upon the flat pin "12".

In order to complete the chain it is necessary to provide a center guide link Fig. 4 having holes "9" exactly the same as the holes in the driving links. It is also necessary to provide the outer links "13" Fig. 5 with holes cut to receive the shape of one of the angular bushings "11" at the end of each group of links. This bushing is then headed over locking the other angular bushing "10" and the flat pin "12" in the chain.

Having described the nature and objects of the invention we now desire to secure as patented the following claims:—

1. In a silent chain a plurality of oppositely disposed alternately arranged links, pintle bearings in said links, two angular bushings arranged opposite to each other extending through said bearings and each engaging upon their rear face with the bearings in alternate links to turn therewith, the front face of each of the bushings provided along a longitudinal medial line with a bearing contact and beveled or cut away above and below such bearing contact, and a flat pin with rounded edges fitted between the angular bushings and extending through the alternately arranged links from side to side thereof and having contact with the bushings on opposite sides and along its longitudinal medial line.

2. In a silent chain a plurality of oppositely disposed alternately arranged links, pintle bearings in said links, two angular bushings arranged opposite to each other extending through said bearings and each engaging upon their rear face with the bearings in alternate links to turn therewith, the front face of each of the bushings provided along a longitudinal medial line with a bearing contact and beveled or cut away above and below such bearing contact, and a flat pin with rounded edges fitted between the angular bushings and extending through the alternately arranged links from side to side thereof and having contact with the bushings on opposite sides and along its longitudinal medial line, and one of said angular bushings engaging side links and headed at its opposite ends to hold the links in assembled position, the ends of the flat pin and the other bushings engaging the inner face of the retaining links.

3. In a silent chain, a plurality of oppositely disposed alternately arranged groups of links, pintle bearings in said links, a pair of bushings arranged opposite to each other extending through said bearings and each engaging upon their rear face with the bearings in one group of alternate links to turn therewith and within the bearings of the other group, a pintle member fitted between the bushings and extending through the bearings of the alternately arranged links from side to side thereof of both groups, and having a bearing contact upon opposite sides with the bushings along a fixed longitudinal medial line and said pintle member and bushings relatively formed to provide a clearance at all points above and below the said fixed line of bearing contact.

4. In a silent chain, a plurality of oppositely disposed alternately arranged groups of links, pintle bearings in said links, a pair of bushings arranged opposite to each other extending through said bearings and each engaging upon their rear face with the bearings in one group of alternate links to turn therewith and within the bearings of the other group, a pintle member fitted between the bushings and extending through the bearings of the alternately arranged links from side to side thereof of both groups and engaging the bearings at oppositely disposed points, and having a bearing contact upon opposite sides with the bushings along a fixed longitudinal medial line and said pintle member and bushings relatively formed to provide a clearance at all points above and below the said fixed line of bearing contact.

5. In a silent chain a plurality of oppositely disposed alternately arranged links, pintle bearings in said links, two angular bushings arranged opposite to each other extending through said bearings and each engaging upon their rear face with the bearings in alternate links to turn therewith, the front face of each of the bushings provided along a longitudinal medial line with a bearing contact and beveled or cut away above and below such bearing contact, and a flat pin with rounded edges fitted between the angular bushings and extending through the alternately arranged links from side to side thereof, and having contact with the bushings on opposite sides and along its longitudinal medial line.

6. In a silent chain a plurality of overlapping links having registering openings in the overlapping ends and a three-part pintle extending through the said openings comprising two oppositely disposed members each moving with alternately overlapping links and a central member, the said central member having a knife edge contact on opposite sides along its longitudinal medial line with the oppositely disposed members.

CARL E. JOHNSON.
JOHN FRANCIS McCANN.